US011912536B2

(12) United States Patent
Mateo Mur

(10) Patent No.: US 11,912,536 B2
(45) Date of Patent: Feb. 27, 2024

(54) ELECTROMECHANICAL DRIVE BY FLEXIBLE TRANSMISSION FOR THE ACTIVATION OF LIFT SAFETIES

(71) Applicant: DYNATECH, DYNAMICS & TECHNOLOGY, S.L., Saragossa (ES)

(72) Inventor: Francisco de Asis Mateo Mur, Saragossa (ES)

(73) Assignee: DYNATECH, DYNAMICS & TECHNOLOGY, S.L., Saragossa (ES)

( * ) Notice: Subject to any disclaimer, the term of this patent is extended or adjusted under 35 U.S.C. 154(b) by 176 days.

(21) Appl. No.: 17/766,810

(22) PCT Filed: Oct. 7, 2019

(86) PCT No.: PCT/ES2019/070672
§ 371 (c)(1),
(2) Date: Apr. 6, 2022

(87) PCT Pub. No.: WO2021/069760
PCT Pub. Date: Apr. 15, 2021

(65) Prior Publication Data
US 2023/0047036 A1 Feb. 16, 2023

(51) Int. Cl.
*B66B 5/22* (2006.01)

(52) U.S. Cl.
CPC .................................... *B66B 5/22* (2013.01)

(58) Field of Classification Search
CPC ................ B66B 5/22; B66B 5/18; B66B 5/16
See application file for complete search history.

(56) References Cited

U.S. PATENT DOCUMENTS 2,945,561 A 7/1960 Moyer

FOREIGN PATENT DOCUMENTS

| | | | | |
|---|---|---|---|---|
| CN | 107445015 A | * 12/2017 | | B66B 5/02 |
| CN | 111392542 A | * 7/2020 | | |
| CN | 115362115 A | * 11/2022 | | B66B 5/044 |
| DE | 202012104436 U1 | * 1/2013 | | B66B 5/18 |
| DE | 102013111385 A1 | * 4/2015 | | B66B 5/18 |
| EP | 968954 A1 | * 1/2000 | | B66B 5/22 |
| ES | 2319706 A1 | * 5/2009 | | B66B 5/22 |

(Continued)

*Primary Examiner* — Diem M Tran
(74) *Attorney, Agent, or Firm* — ALBERT BORDAS P.A.

(57) ABSTRACT

Drive comprising a set of safeties that can be bidirectional or unidirectional. In the case of the bidirectional system, it is formed by two wedge rollers (1) and (2) that run through oblong grooves (11) and (12) respectively provided in a protective plate (16). The wedge rollers (1) and (2) are assembled onto floating anchors (14) and (15) respectively, which anchors are linked together by means of a spring (5); on the other hand it comprises a drive assembly comprising a coil (3) where the transmission between the drive and the wedge assembly is carried out by means of a flexible transmission comprising two cables (7) and (8) joined at one of their ends to the drive assembly and at the other end to the floating anchors (14) and (15) on which the wedge rollers (1) and (2) are mounted. In addition, the bolts of the rollers (1) and (2) run through the oblong holes of a discriminating plate (6) which is responsible for separating the non-wedged roller from the guide. This system allows separate mounting of the wedge assembly with respect to the drive assembly.

4 Claims, 6 Drawing Sheets

(56) References Cited

FOREIGN PATENT DOCUMENTS

| | | | | | |
|---|---|---|---|---|---|
| WO | 0039016 | A1 | | 7/2000 | |
| WO | WO-2012038558 | A1 | * | 3/2012 | ......... B66B 11/0206 |
| WO | 2015126863 | A2 | | 8/2015 | |
| WO | WO-2021001580 | A1 | * | 1/2021 | ............... B66B 5/18 |
| WO | WO-2023187231 | A1 | * | 10/2023 | ............... B66B 5/18 |

* cited by examiner

ELECTROMECHANICAL DRIVE BY FLEXIBLE TRANSMISSION FOR THE ACTIVATION OF LIFT SAFETIES

OBJECT OF THE INVENTION

The object of this invention as stated in the title of the invention provides an electromechanical actuator by flexible transmission for the activation of lift safeties and which allows the positioning of one of the movable rollers for braking, serving both for unidirectional safeties as for bidirectional safeties.

This invention is characterised by the special configuration and design of each of the elements of the electromechanical drive to achieve an effective and safe transmission between an electronic device for overspeed detection and an element that stops the lift car, allowing the same device to be activated both while ascending and descending or only when descending, depending on the configuration.

This invention lies therefore within the field of lifts, and, in particular, safety measures used for emergency braking of a lift.

BACKGROUND OF THE INVENTION

Due to the evolution of the market towards more precise and versatile electronic components, components which have traditionally been mechanical within lifts are being replaced by electronic components. Communication between the new electronic components and existing mechanical components requires novel developments in the market that connect both types of components.

The force of mechanical activation by means of a cable and the adhesion of this cable in a groove of the pulley is replaced by the activation of a spring retained by a coil.

The system's new electronic elements for overspeed detection during uncontrolled movements of the lift car or a free fall open a contact at the moment they encounter this safety failure. Thus, these solutions are based on an electromechanical element for activating the safeties. As soon as there is a power cut in the system, the coil is de-energised and a spring applies the activation force for the safeties, bringing the roller or rollers to its or their braking position.

Therefore, in the state of the art we find solutions for mechanical transmission of the drive from the activation coil when it is de-energized to the locking rollers, where all these solutions are complex in their conception and functional precision, in addition to being rigid because they must be installed and located in specific places.

A solution close to the object of the invention is that described in patent EP 1048602, which has two rollers driven through their corresponding arm and the ends of the actuating arms being joined by means of a connecting spring.

Consequently, it is the object of the present invention to overcome the drawbacks of the prior art solutions related to a lack of precision, excess complexity and lack of versatility, developing an electromechanical drive such as the one described below and the essence of which is set forth in the first claim.

DESCRIPTION OF THE INVENTION

The object of the present invention is an electromechanical drive by flexible transmission for lift safeties for braking, that is, the device object of the invention seeks mechanical activation for the lift emergency braking system known as lift safeties and which performs in a proactive manner, that is, a spring is responsible for maintaining the system in the activation position and a coil is responsible for maintaining the system inactivated or retained.

The invention is the necessary interface between an electronic overspeed detection system and the element responsible for stopping the lift car in an emergency.

The interface or transmission system between the electronic overspeed detection means that open a contact and the mobile rollers in charge of braking is the object of the search, and in this case said interface is carried out by means of a flexible transmission in the manner of a cable.

It should be mentioned that everything described for the bidirectional version with two rollers is considered valid for the unidirectional version with one roller, except for the modifications necessary for suppression of the ascending roller and the use of a single flexible transmission means.

The electromechanical drive by flexible transmission for braking using lift safeties comprises a bidirectional wedge assembly formed by two wedge rollers that run through oblong grooves made in a discrimination plate and are mounted on floating anchors and joined together by means of a spring, on the other hand it comprises a drive assembly comprising a coil characterised in that the transmission between the drive and the wedge assembly is carried out by means of a flexible transmission comprising two cables connected at one of its ends to the drive assembly and at the other end to the floating anchors on which the wedge rollers are mounted.

The drive assembly comprises a coil, preferably double winding, on which a skid is connected and which in turn is connected to a mobile carriage balanced by two compensating springs joined at the lower vertices of the mobile carriage and on which joints between the mobile carriage and the compensating springs are connected each of the ends of the cable.

The flexible electromechanical transmission mechanism works as described below.

- In normal operation of the device the solenoid is activated and therefore exerts a force on the cables which in turn do so on the floating anchors on which the rollers are mounted, the rollers thus adopting a position such that they do not make any contact with the guide.
- Once an overspeed is detected, the solenoid deactivates so that the connecting spring between the floating anchors moves them and consequently the rollers are positioned in touch with the lift guide.
- The floating anchors and therefore the rollers attached to each of the floating anchors run through a curved groove that allows the rollers to approach the guide and depending on the direction of travel relative to the guide one of the rollers will interlock while the other roller will separate from the guide due to a discriminating plate.

Except when stated otherwise, all the technical and scientific elements used in this specification have the meaning usually understood by a person skilled in the art of this invention. In practice, this invention can use processes and materials that are similar or equivalent to those described in the specification.

Throughout the description and claims the term "comprises" and the various forms thereof are not meant to exclude other techniques, additives, components or steps. A person skilled in the art will recognise that other objects, advantages and features of the invention follow in part from the description and in part from the practising of the invention.

DESCRIPTION OF THE DRAWINGS

In order to complement the description being made and to aid towards a better comprehension of the features of the invention, according to our preferred practical embodiment, we incorporate as an integral part of said description a set of drawings that are illustrative and not limiting in nature and represent the following.

PREFERRED EMBODIMENT OF THE INVENTION

Figure 1:
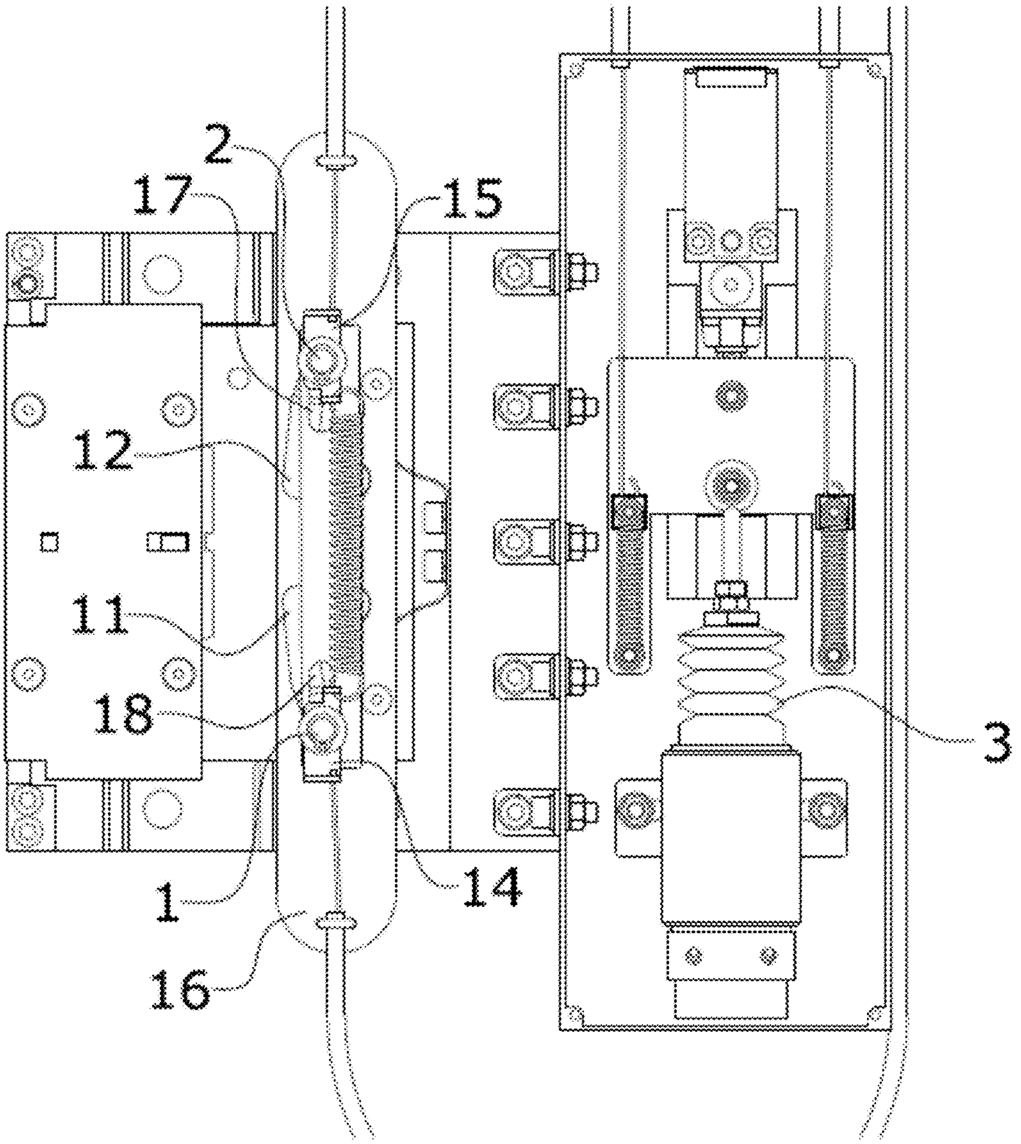
FIGS. 1 to 5 show and progressively identify the different elements that are part of the electromechanical drive for braking lift safeties by means of flexible transmission, where the wedging means and the drive are assembled and joined together.
Figure 2:
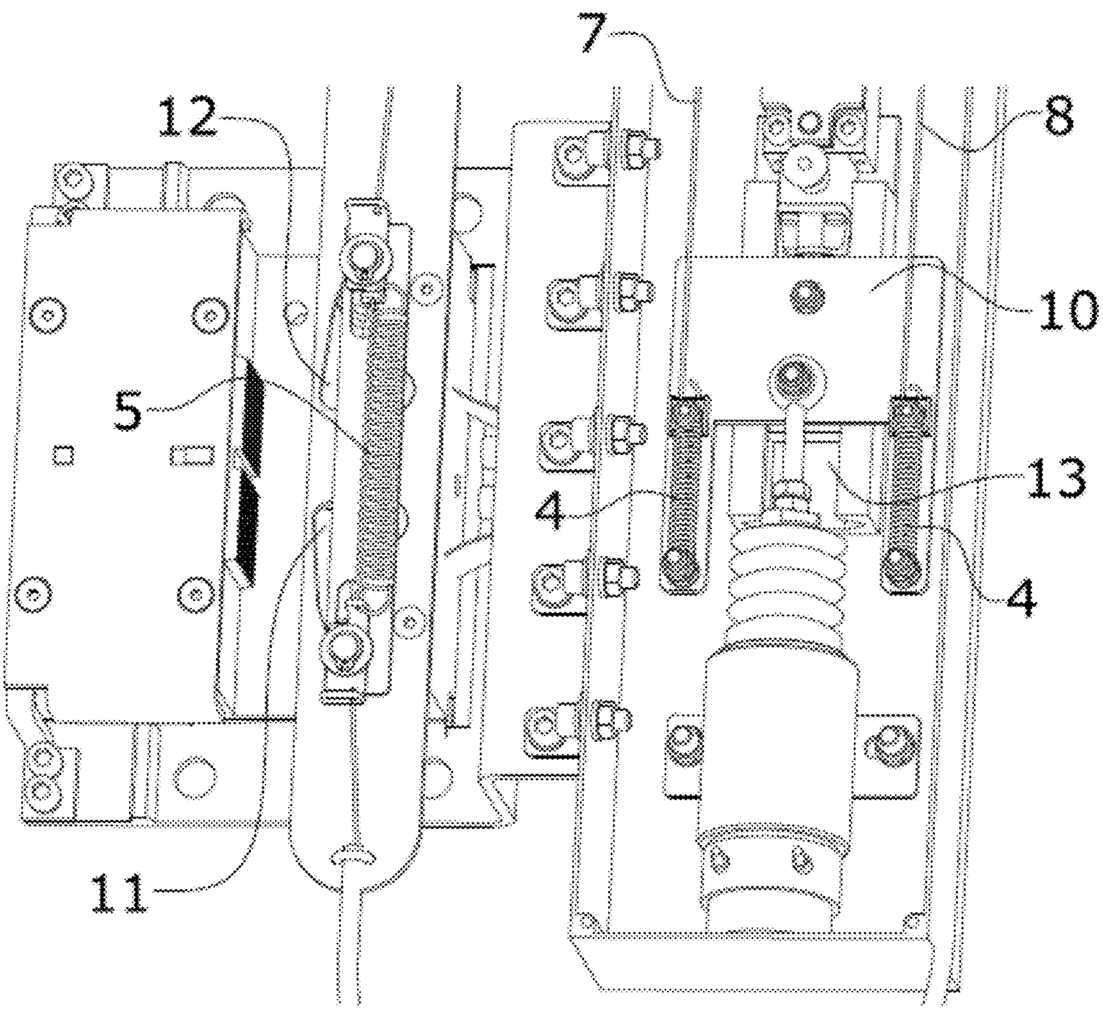

In view of the figures, a preferred embodiment of the proposed invention is described below.

FIGS. 1 to 4 show that the bidirectional electromechanical drive by flexible transmission comprises:

A wedge assembly formed by two wedge rollers (1) and (2) that run through oblong grooves (11) and (12) respectively made on a protective plate (16), the wedge rollers (1) and (2) being joined by a spring (5) and mounted on floating anchors (14) and (15) respectively.

A drive assembly comprising a coil (3) that when the system is at rest is actuated by placing the wedge rollers (1) and (2) in a non-interlocked position against the force of the spring (5). In addition, it comprises means for adapting the transmission of the coil drive (3) to the transmission means from the drive assembly to the wedge assembly.

Figure 5:
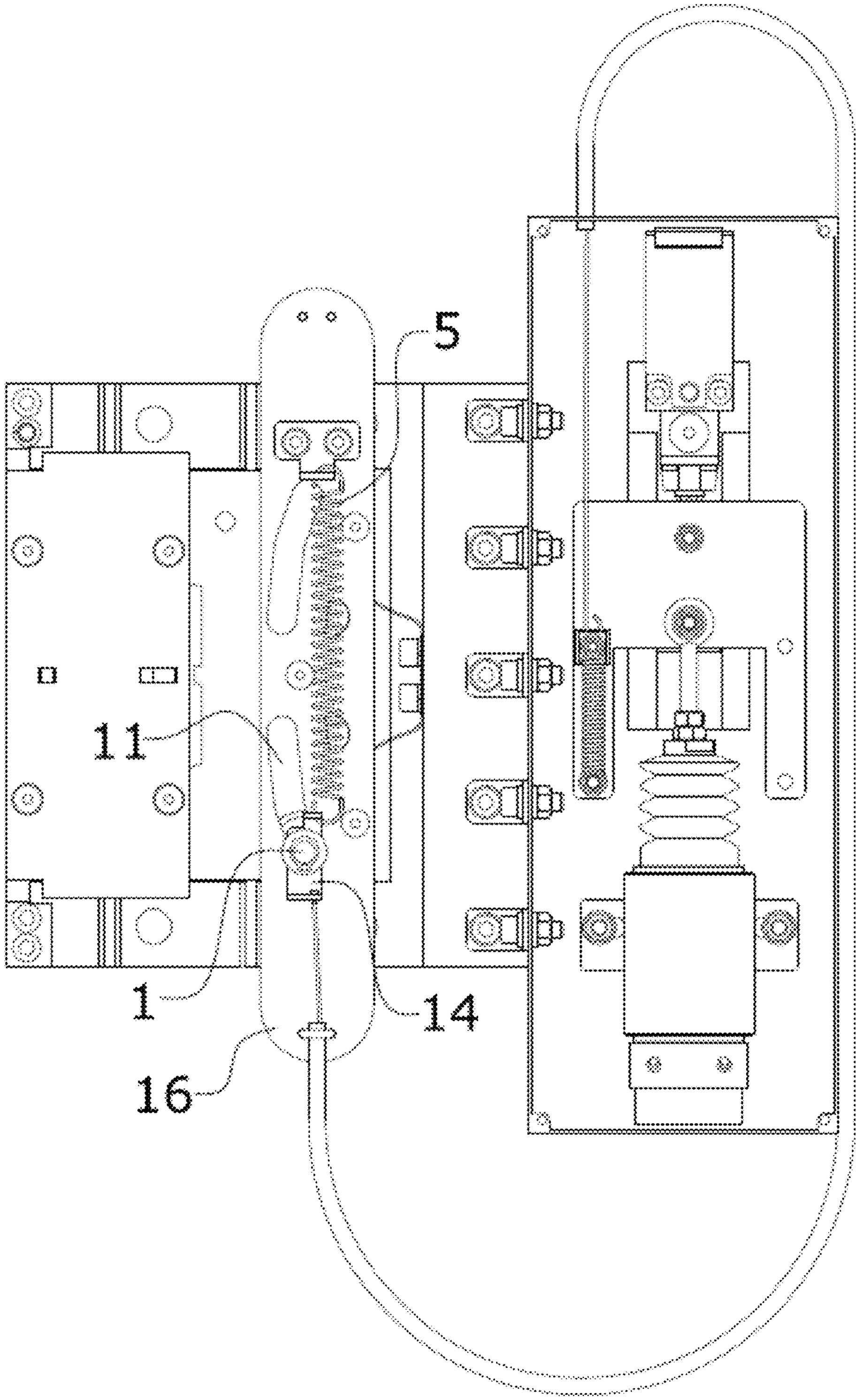

FIG. 5 shows the unidirectional version of the flexible drive and what it comprises.

A wedge assembly formed by a wedge roller (1) and running through an oblong groove (11) made on a protective plate (16), the wedge roller (1) being attached to a fastening by means of a spring (5) and mounted on a floating anchor (14).

A drive assembly comprising a coil (3) characterised in that the transmission between the drive and the wedge assembly is carried out by means of a flexible transmission comprising a cable (7) connected at one of its ends to the drive assembly and at the other end to a floating anchor (14) on which the wedge roller (1) is mounted.

Where the transmission means from the drive assembly to the set of wedges are flexible means, preferably cables.

The means for adapting the transmission of the drive from the coil (3) to the transmission means comprise a mobile carriage (10) preferably rectangular in shape that has first ends of two compensating springs (4) attached at its lower corners, the mobile carriage (10) being linked to the end of the coil (3) by means of a skid (13), and where the flexible transmission means are joined on the first ends of the two compensating springs (4) at their junction with the mobile carriage (10).

The flexible transmission means comprise two rods (7) and (8) that run between the joint of the end of the compensating spring (4) with the mobile carriage (10) and the floating anchors (14) and (15) of the wedge rollers (1) and (2).

The system will carry a safety contact (9) that will cut the safety line.

Figure 6:
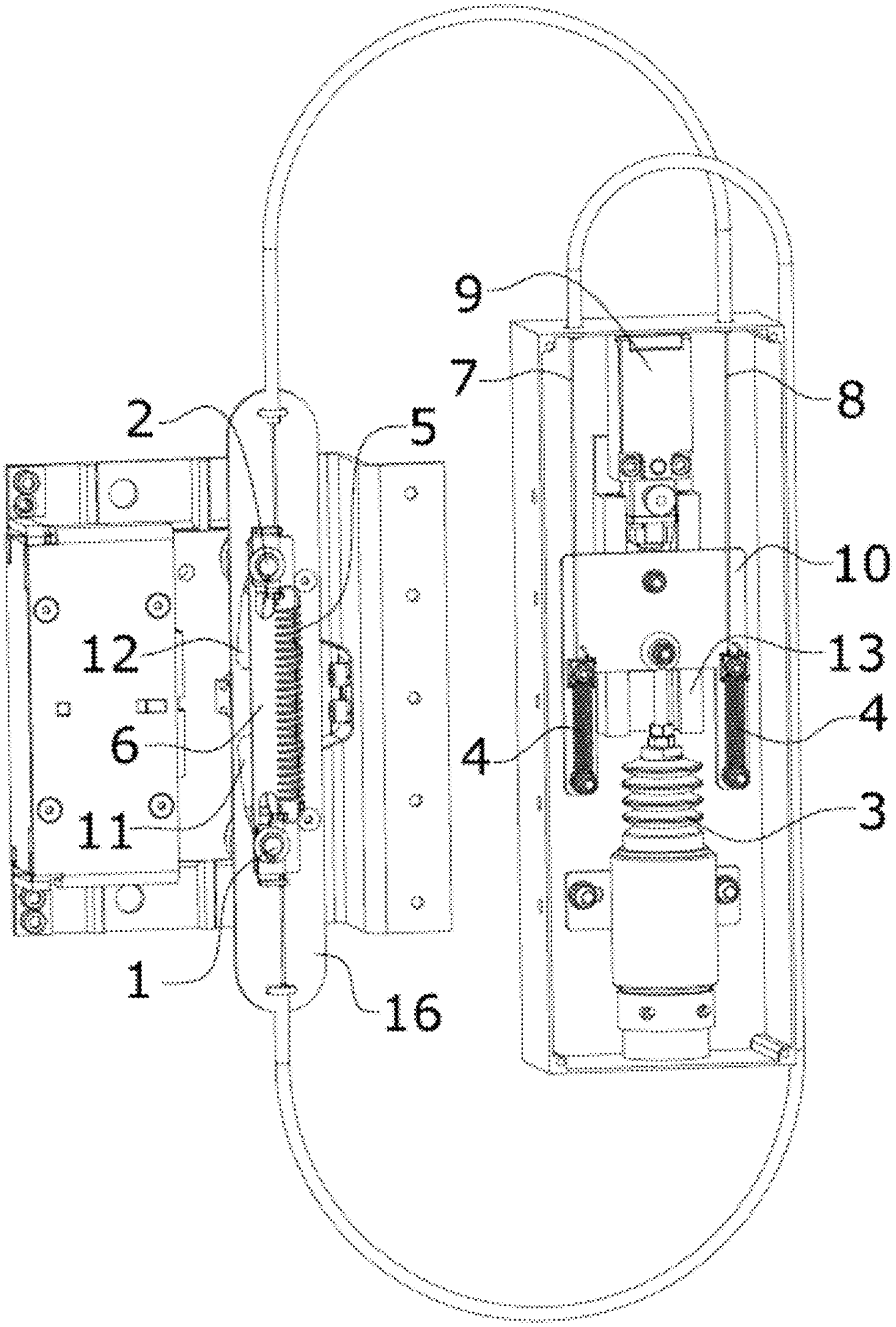
FIG. 6 shows a representation of the same previous elements except that the wedging means of the guide and the drive means are not mounted together, but separately.

It is interesting to say that the reset assembly can be separated from the safeties themselves because the cables allow this separation, facilitating assembling the safety assembly separately. (FIG. 6). Leaving the part of the safeties and the block in the frame and taking the part of the coil to another more convenient location of the lift car such as above the cabin.

It is important to highlight that this configuration allows the use of a single solenoid that, by means of a double mobile carriage, allows the right and left safeties to be activated simultaneously.

In this way, since the system works in positive safety, the maintenance solenoid can be connected to the encoder device or other positioning device and the more powerful solenoid can be connected to the control panel. When we talk about solenoids we do not intend to limit the invention to a single actuator, since the activation could be functional with another element such as a single coil solenoid with an electric actuator.

Figure 3:
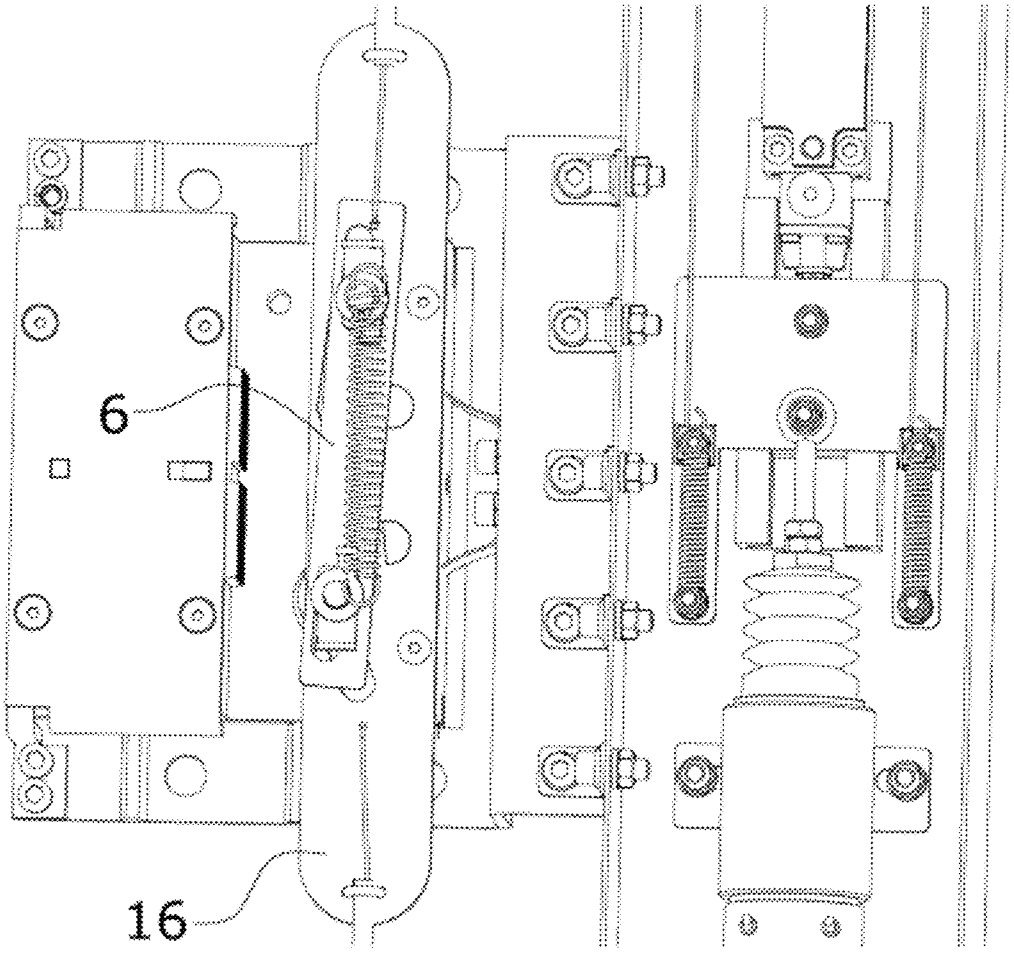
Figure 4:
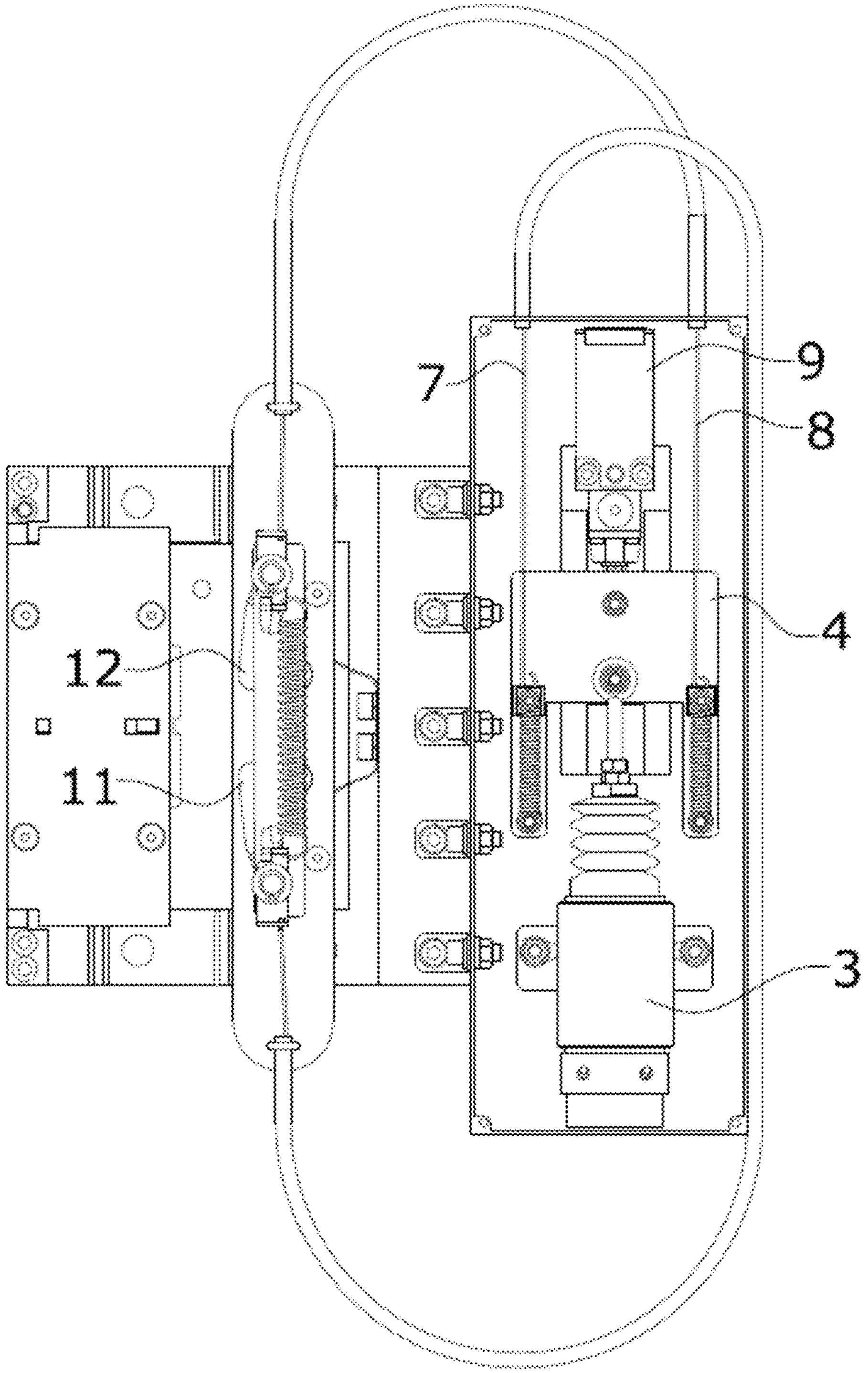

A discriminating plate (6) has been designed to discriminate between the directions of the lift car. This consists in a sheet with two slotted holes (17) and (18) through which the roller bolt runs. When the wedging has not occurred, the plate is resting by gravity on the bolt, butting against the upper position of the upper oblong. When the rollers are placed in the wedging position, the bolt of the rollers circulates along the oblong of the discriminating plate without opposition and when one of the rollers is wedged the other would move away since said plate would push the bolt of the other roller towards a non-interlocking position (FIG. 3).

Having sufficiently described the nature of this invention and the embodiment thereof, it is noted that without departing from the essence thereof, other embodiments are possible that may differ in certain details from that given by way of example, which will also be included in the scope of protection sought, provided the main principle of the invention is not altered, changed or modified.

The invention claimed is:

1. An electromechanical drive by flexible transmission for the activation of lift safeties comprising a bidirectional wedge assembly comprising:

a first wedge roller and a second wedge roller that run through a first oblong groove and a second oblong groove, respectively, on a protection plate, said first and second wedge rollers are mounted on a first floating anchor and a second floating anchor, respectively, and the first and second floating anchor joined together by means of a spring;

a drive assembly comprising a coil characterized in that a transmission between the drive assembly and the wedge assembly is carried out by means of a flexible transmission comprising a first cable and a second cable joined at one end to the drive assembly and at the other end to the first and second floating anchors on which the first and second wedge rollers are mounted, respectively;

wherein the first and second floating anchors are mounted on a discriminating plate.

2. The electromechanical drive by flexible transmission for the activation of lift safeties according to claim 1, characterized in that the drive assembly comprises a coil attached to a skid, which is in turn connected to a mobile carriage balanced by two compensating springs joined at lower corners of the mobile carriage and on which joints of the mobile carriage with the compensating springs are connected each of the one ends of the cables.

3. The electromechanical drive by flexible transmission for the activation of lift safeties according to claim 1, characterized in that the drive assembly has a safety contact that will cut a safety line.

4. The electromechanical drive by flexible transmission for the activation of the lift safeties according to claim 1, characterized in that the drive assembly and the wedge assembly are mounted separately from one another.

* * * * *